(12) United States Patent
Tower et al.

(10) Patent No.: US 10,118,777 B1
(45) Date of Patent: Nov. 6, 2018

(54) SERVER RACK RAMPS WITH LINKAGE-ARM HINGES

(71) Applicant: HEWLETT PACKARD ENTERPRISE DEVELOPMENT LP, Houston, TX (US)

(72) Inventors: Daniel W Tower, Houston, TX (US); Paul E Westphall, Tomball, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/581,328

(22) Filed: Apr. 28, 2017

(51) Int. Cl.
*B65G 69/30* (2006.01)

(52) U.S. Cl.
CPC .................... *B65G 69/30* (2013.01)

(58) Field of Classification Search
CPC .. B65G 69/2876; B65G 69/30; B63B 27/143; B63B 2027/141; E01D 15/124; E01D 18/00
See application file for complete search history.

(56) References Cited

U.S. PATENT DOCUMENTS

| | | | | |
|---|---|---|---|---|
| 3,713,553 A | * | 1/1973 | Curtis | B60P 1/435 296/61 |
| 4,157,089 A | * | 6/1979 | Loughrey | A61G 13/105 108/116 |
| 4,761,847 A | | 8/1988 | Savage et al. | |
| 4,779,298 A | | 10/1988 | Nichols, Sr. et al. | |
| 5,440,773 A | * | 8/1995 | Lentini | B60P 1/43 14/69.5 |
| 6,139,249 A | * | 10/2000 | Lucht | B65G 69/30 14/69.5 |
| 6,354,758 B1 | * | 3/2002 | Chaulk | E04G 1/15 182/222 |
| 7,237,294 B2 | * | 7/2007 | Lensing | B65G 69/30 14/69.5 |
| 7,308,726 B2 | | 12/2007 | Schomaker et al. | |

(Continued)

FOREIGN PATENT DOCUMENTS

WO  WO-2017/009818 A1  1/2017

OTHER PUBLICATIONS

Haulmaster 1000 Lb. Capacity 9 In.×72 In. Tri-fold Loading Ramps, Harbor Freight Tools, Retrieved from internet Mar. 27, 2017, 2 pages.

*Primary Examiner* — Abigail A Risic
(74) *Attorney, Agent, or Firm* — Hewlett Packard Enterprise Patent Department

(57) ABSTRACT

A server rack ramp includes an upper ramp section, a lower ramp section and a linkage assembly. The linkage assembly may include a body and arms. The lower ramp section may be pivotally connected to the body of the linkage assembly by a first hinge. The body of the linkage assembly may be connected to the arms by a second hinge. The arms of the linkage assembly may be connected to the upper ramp section by a third hinge. The lower and upper ramp sections may be movable between a folded position and an unfolded position via the linkage assembly. When the upper ramp section is unfolded, the lower and upper ramp sections are moveable longitudinally relative to one another via rotation of the arms relative to the main body of the linkage assembly and relative to the upper ramp section.

19 Claims, 7 Drawing Sheets

(56) References Cited

U.S. PATENT DOCUMENTS

| | | | |
|---|---|---|---|
| 7,478,449 B2 * | 1/2009 | Williams | B65G 69/30 14/69.5 |
| 7,526,826 B2 | 5/2009 | Bailie | |
| 8,234,737 B2 | 8/2012 | Morris et al. | |
| 8,302,235 B1 * | 11/2012 | Bailie | B60P 1/43 14/69.5 |
| 8,468,632 B1 * | 6/2013 | Ricci | A01K 1/035 14/69.5 |
| 9,279,221 B1 * | 3/2016 | Orona | E01D 15/124 |
| 9,820,899 B1 * | 11/2017 | Morris | A61G 3/061 |
| 2003/0182740 A1 * | 10/2003 | Schmaltz | A61G 3/061 14/69.5 |
| 2006/0117502 A1 * | 6/2006 | Lensing | B65G 69/30 14/69.5 |
| 2007/0234491 A1 * | 10/2007 | Bailie | B65G 69/30 14/69.5 |
| 2007/0289073 A1 * | 12/2007 | Williams | B65G 69/30 14/69.5 |
| 2009/0300859 A1 * | 12/2009 | Lucht | B65G 69/30 14/69.5 |
| 2010/0281635 A1 * | 11/2010 | Hemby | E01D 15/124 14/69.5 |
| 2012/0297558 A1 | 11/2012 | Wang et al. | |
| 2015/0013081 A1 * | 1/2015 | Breeden, III | B65G 69/30 14/69.5 |
| 2015/0074925 A1 * | 3/2015 | Levi | B65G 69/30 14/72.5 |
| 2016/0137117 A1 * | 5/2016 | Parrish | B65G 69/30 414/537 |
| 2017/0081137 A1 * | 3/2017 | Breeden, III | B65G 69/30 |

* cited by examiner

SERVER RACK RAMPS WITH LINKAGE-ARM HINGES

BACKGROUND

Foldable ramps provide a foldable and inclined surfaces on which an object can travel between surfaces at different heights. The loading and unloading of electronic equipment, in particular server racks, from one surface height, for example from a pallet on which the server racks are generally transported and provided, to another surface height, for example the floor of a facility such as the data center in which the server racks are generally installed, may be a difficult task due to the weight and dimensions of the server racks. These server racks may be up to 1800 kilograms in mass.

DETAILED DESCRIPTION

Figure 1:
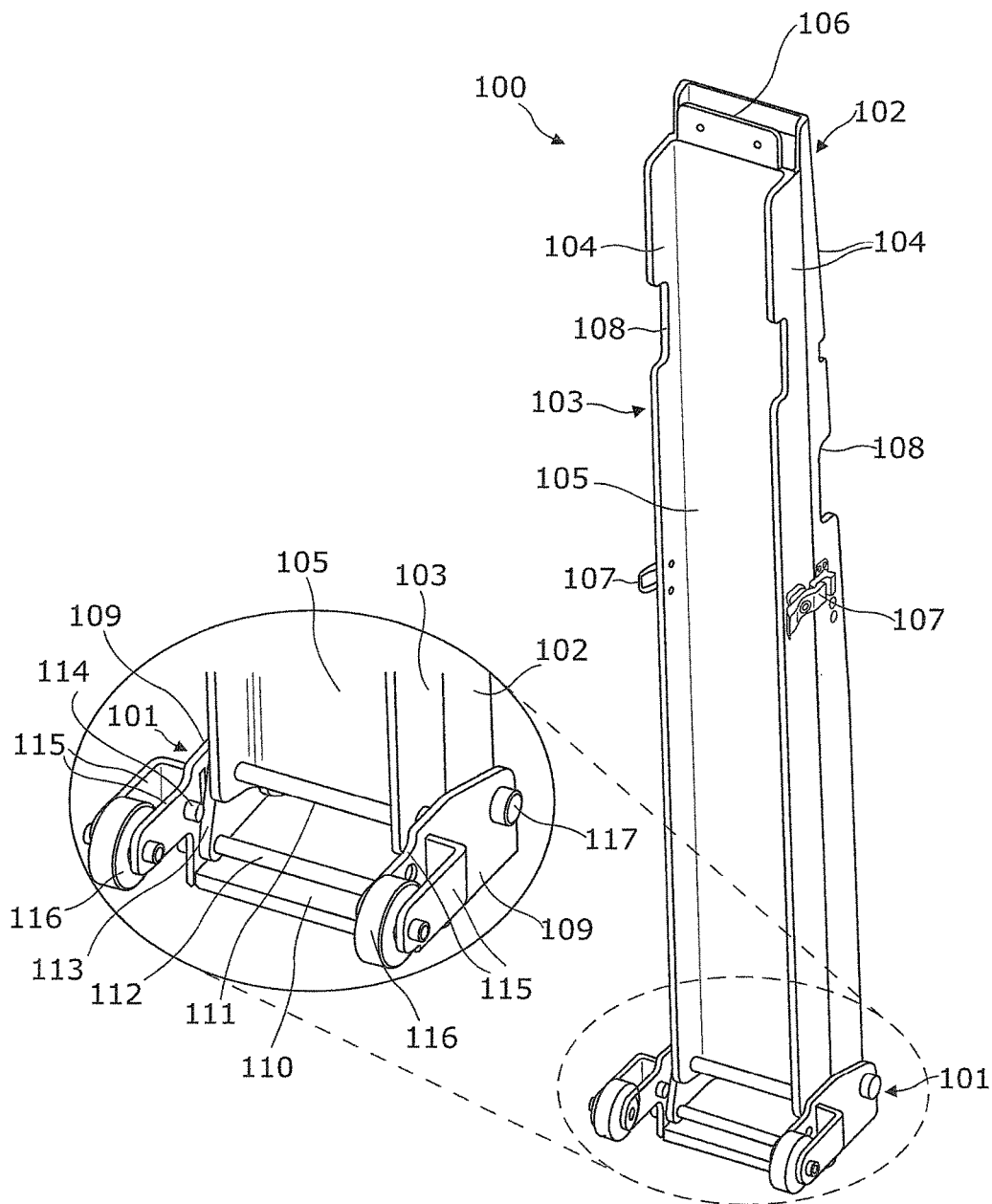
FIG. 1 is a perspective view of an example server rack ramp with a linkage-arm hinge in its folded position.

Server racks may be transported, stored and delivered to facilities, for example data centers in which they are installed, mounted on pallets or similar. The pallets may define a first surface height, on which the server rack may rest, and the floor of the facility, on which these server racks may be stored or installed, may define a second surface height. Transporting these server racks from the pallets to the floor of the facility in which they are to be installed (or vice versa) or stored, may be made using ramps that provide an inclined surface allowing the server racks to travel between the pallets and the floor. Due to the height and weight of the server racks, these ramps may have a significant length. Depending on the height difference between the two surfaces that the ramp is to compensate and in order to avoid ramp inclinations that may make the loading or unloading operation dangerous for users or the equipment, these ramps may have dimensions that may occupy too large of a footprint for storage and shipping.

For example, some ramps are either completely solid and take up a large footprint when deployed or stored, or may comprise several disassembled portions that have to be assembled each time they are to be used. Besides, ramps may be too heavy and difficult to maneuver such that it make take large physical exertion or several persons to move the ramps. Some ramps may further present gaps between the assembled portions that may provoke the falling of the elements to be loaded or unloaded since the wheels of these elements could fall into the gap.

To address these issues, examples disclosed herein describe server rack ramps comprising an upper ramp section having a base surface with a first end and a second end, a lower ramp section having a base surface with a first end and a second end and a linkage assembly on which the second end of the lower ramp section may be pivotally mounted by a hinge and on which the first end of the upper ramp section may be pivotally mounted by a linkage-arm hinge. The lower and upper ramp sections may be respectively movable between a folded position and an unfolded position by the respective hinge and linkage-arm hinge, the folded position corresponding to a position in which the base surfaces of the upper and lower ramp sections substantially contact each other and the unfolded position corresponding to a position in which the base surfaces of the upper and lower ramp sections are substantially co-planar. In such examples, the upper ramp section, when unfolded, may be to pivotally rotate relative to the linkage assembly and may be to move towards, by the linkage-arm hinge, the lower ramp section until the first end of the upper ramp section contacts the second end of the lower ramp section. In such examples, the server rack ramp may be used for ascending or descending a server rack to or from a first surface to a second surface wherein the two surfaces are at different height. In some examples, the server rack ramp may be used for ascending or descending a server rack to or from a pallet.

In some examples, the upper ramp section and the lower ramp section may further comprise two side walls downwardly protruding from opposing side edges of the respective base surfaces defining corresponding channel-U-sections in the lower and upper ramp sections. These side walls may contribute to provide a higher mechanical strength to the ramp and may also serve, at least partially, as a contact surface between the server rack ramp and the floor of the facility. In some other examples, the two side walls may protrude above the base surfaces of the upper ramp section and the lower ramp section defining an I-beam section. The protruding portions may be disposed along the side edges of the base surfaces of the upper and lower ramp sections avoid wheels of the server racks to the get out of the path defined by the base surface.

In some other examples, the linkage-arm hinge may comprise a first hinge attached to the linkage assembly, a second hinge that may be attached in proximity to the first end of the upper ramp section and two arms that may be attached at one end to the first hinge and at the opposite end to the second hinge. In such example, the two arms may be to rotate relative to the linkage assembly and to the upper ramp section. The second hinge may allow to rotatably move the upper ramp section relative to the linkage assembly, and the first hinge with the rotatable movement of the two arms may allow to longitudinally move the upper ramp section towards the lower ramp section until the second end of the lower ramp section contacts with the first end of the upper ramp section.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples. Elements shown in the various figures herein may be added, exchanged and/or eliminated so as to provide a number of additional examples of the present disclosure. In addition, the proportion and relative scale of the elements provided in the figures are intended to illustrate the examples of the present disclosure and should not be taken in a limiting sense.

FIG. 1 shows a perspective view of an example server rack ramp 100 with a linkage-arm hinge in its folded position. FIG. 1 also shows an enlarged view of the linkage assembly 101 of the server rack ramp 100. It should be understood that the example server rack ramp 100 depicted in FIG. 1 may include additional components and that some of the components described herein may be removed and/or modified without departing from a scope of the server rack ramp 100.

The server rack ramp 100 comprises a lower ramp section 102 and an upper ramp section 103 joined to each other by the linkage assembly 101. The lower ramp section 102 and the upper rack section 103 are longitudinal ramp sections having a base surface 105 along which the equipment to be loaded/unloaded passes over. The lower ramp section 102 defines a first end corresponding to the portion of the lower ramp section 102 contacting the lower surface height, for example, the floor surface, and a second end corresponding to the portion of the lower ramp section 102 contacting the upper ramp section 103. In turn, the upper ramp section 103 defines a first end corresponding to the portion of the upper ramp section 103 contacting the lower ramp section 102, and a second end portion corresponding to the portion of the upper ramp section 103 contacting the upper surface height, for example the pallet surface. The lower ramp section 102 at least partially rests on the ground surface, for example the floor of a facility. The upper ramp section 103 comprises a transition plate 106 at its second end that is to be attached to the surface of the pallet. The transition plate 106 is used to provide a substantially planar and continuous surface from a pallet, which is used to support the server rack during transport and delivery, to the upper ramp section 103. The first end of the lower ramp section 102 may provide a substantially planar and continuous path from the lower ramp section 102 to a floor surface (or lower surface height).

The upper ramp section 103 and the lower ramp section 102 comprise respective opposing side walls 104 downwardly protruding from opposing side edges of the respective base surfaces 105 of the sections 102,103 to structurally reinforce the server rack ramp 100. The base surfaces 105 and the side walls 104 define a U-shaped section of the upper and lower ramp sections 102,103. In such example, the external sides of the side walls 104 of the lower and upper ramp sections 102,103 comprise a latch mechanism 107 to retain the sections 102,103 in the folded position. The side walls of the lower an upper ramp sections 102,103 also comprise recesses 108 to be used as handles for transporting the server rack ramp 100 and for manually folding or unfolding the server rack ramp 100.

As shown in FIG. 1, the lower ramp section 102 and the upper ramp section 103 are joined to each other by the linkage assembly 101. The linkage assembly 101 comprises a U-shaped body having a bottom wall 110 and two opposing side walls 109. The bottom wall 110 is substantially planar and rests on the floor when folded. In this way, the folded server rack ramp 100 can stands on the bottom wall 110 when stored occupying very little space. The bottom wall 110 also rests on the lower surface height when unfolded. The lower ramp section 102 is attached to the linkage assembly 101 by a hinge 117. This hinge 117 is attached to the opposing side walls 104 of the lower ramp section 102 and allows the lower ramp section 102 to rotate down from its folded position to its unfolded position. The upper ramp section 103 is attached to the linkage assembly 101 by a linkage-arm hinge. The linkage-arm hinge comprises a first hinge 112 attached to the linkage assembly 101, a second hinge 111 attached to the upper ramp section 103 and two arms 113 rotatably attached at one end to the first hinge 112 and at the opposite end to the second hinge 111. In such example, the two arms 113 rotate relative to the first hinge 112 and to the second hinge 111. The first hinge 112 allows to longitudinally move the upper ramp section 103 towards the lower ramp section 102 until the second end of the lower ramp section 102 contacts the first end of the upper ramp section 103 and the second hinge 111 allows the upper ramp section 103 to rotate down from its folded position to its unfolded position. In such example, the hinge 117 and the first hinge 112 of the linkage-arm hinge are attached to the two opposing side walls 109 of the linkage assembly 101. The second hinge 111 of the linkage-arm hinge is attached to the opposing side walls 104 of the upper ramp section 103. In such example, the folding and unfolding operation of the upper ramp section 103 and the lower ramp section 102 is independent from each other.

Besides, the linkage assembly 101 comprises wheel brackets 115 attached to respective side edges of the two opposing side walls 109 such that the pair of wheel brackets 115 are located on opposing sides of the server rack ramp 100. These wheel brackets 115, which protrude outwardly and parallel to the bottom wall 110 of the U-shaped body, retain respective wheels 116 at their free end so that the server rack ramp 100 can be transported from one location to another on the pair of wheels 116. When the folded server rack ramp 100 is inclined towards the wheels 116, such that the bottom wall 109 of the linkage assembly 101 do not contact the floor, the wheels 116 enable the sever rack ramp 100 to easily move. These wheels 116 allow for the ramp 100 to easily move while most of the weight of the ramp 100 is on the wheels 116 which facilitates carrying and transporting the ramp. In some examples, the inner surfaces of the wheel brackets 115 comprise respective protrusions 114 that are to abut against a lower edge of the side walls 104 of the upper ramp section 103 such that when the upper ramp section 103 is rotated relative to the second hinge 111 of the linkage assembly 101, this rotating movement stops when the lower edge the side walls 104 abuts against the protrusions 114. In some other examples, the linkage assembly 101 may comprise a different number of wheels and respective wheels brackets attached to the U-shaped body.

Figure 2:
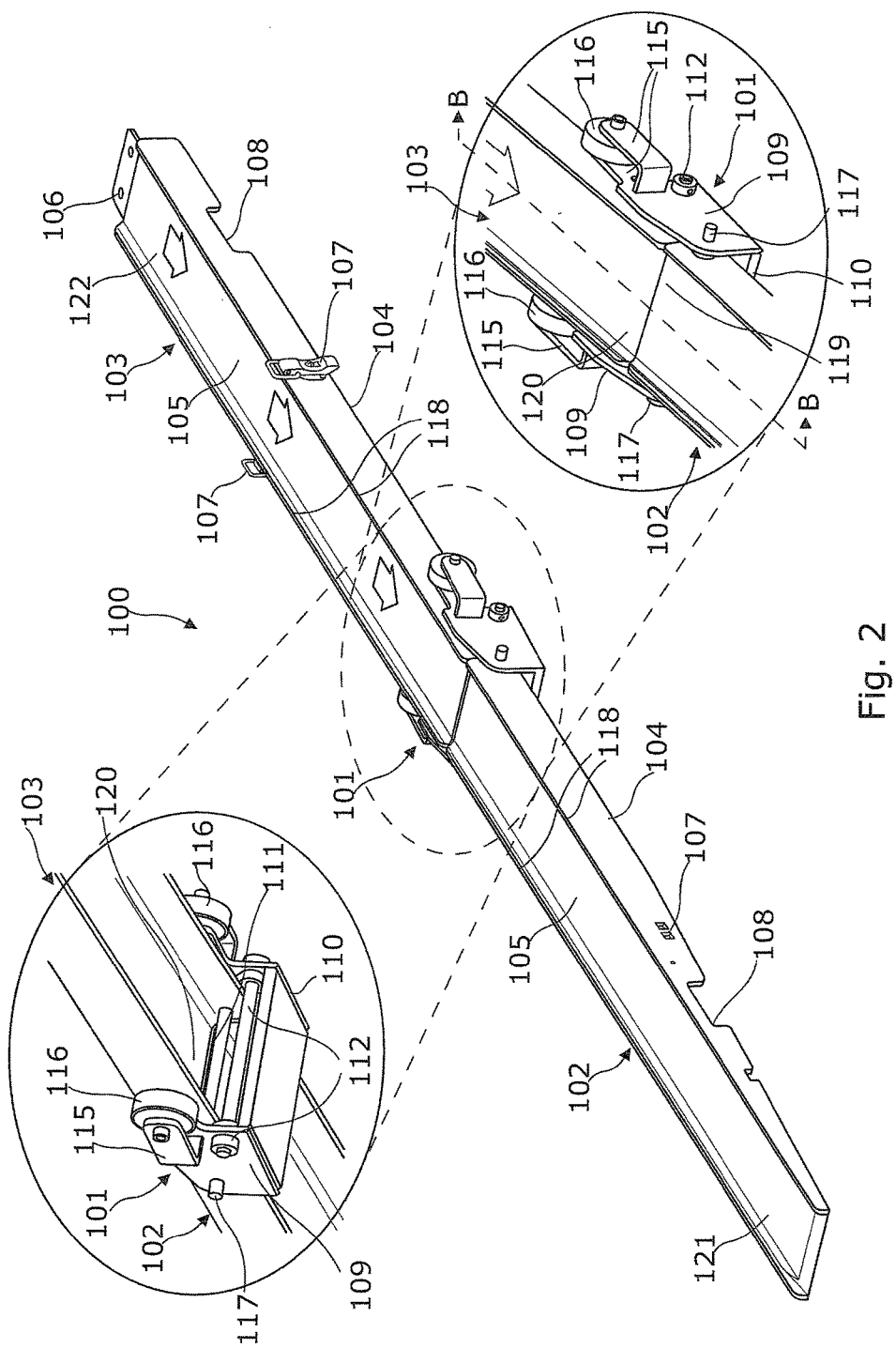
FIG. 2 is a perspective view of the example server rack ramp with a linkage-arm hinge of FIG. 1 in its unfolded position.

FIG. 2 is a perspective view of the example server rack ramp 100 with a linkage-arm hinge of FIG. 1 in its unfolded position. FIG. 2 also shows an upper and a lower enlarged view of the linkage assembly 101 of the server rack ramp 100. It should be understood that the example server rack ramp 100 depicted in FIG. 2 may include additional components and that some of the components described herein may be removed and/or modified without departing from a scope of the server rack ramp 100.

In FIG. 2 the server rack ramp 100 is shown completely unfolded and deployed. In such example, the second end 119 of the lower ramp section 102 contacts the first end 120 of the upper ramp section 103 creating a continuous and co-planar surface between the two base surfaces 105 along which the equipment, for example the server racks, may pass over. In turn, the first end 121 of the lower ramp section 102 at least partially rests on the ground surface, for example the floor of a facility, and the second end 122 of the upper ramp section 103 may be attached to the upper surface height, for example the pallet surface, by the transition plate 106. In such example the bottom wall 110 of the linkage assembly 101 also rests on the ground surface, for example the floor of a facility, to provide stability to the server rack ramp 100. In some examples the transition plate 106 may be screwed to the pallet.

The side walls 104 protrude above the respective base surfaces 105 of the upper ramp section 103 and the lower ramp section 102 that together with the side walls 104 define an I-beam section of the lower and upper ramp sections 102,103. The protruding portions 118 are disposed along the side edges of the base surfaces 105 of the lower and upper ramp sections 102,103 and avoid wheels of the equipment, for example, wheels of the server racks, to get out of the path defined by the base surfaces 105. When the server rack ramp 100 is completely unfolded and deployed, the wheels 116 and theirs respective wheel brackets 115 are below the base surface 105 of the upper ramp section 103 to avoid obstructing the loading or unloading of the equipment.

Figure 3A:
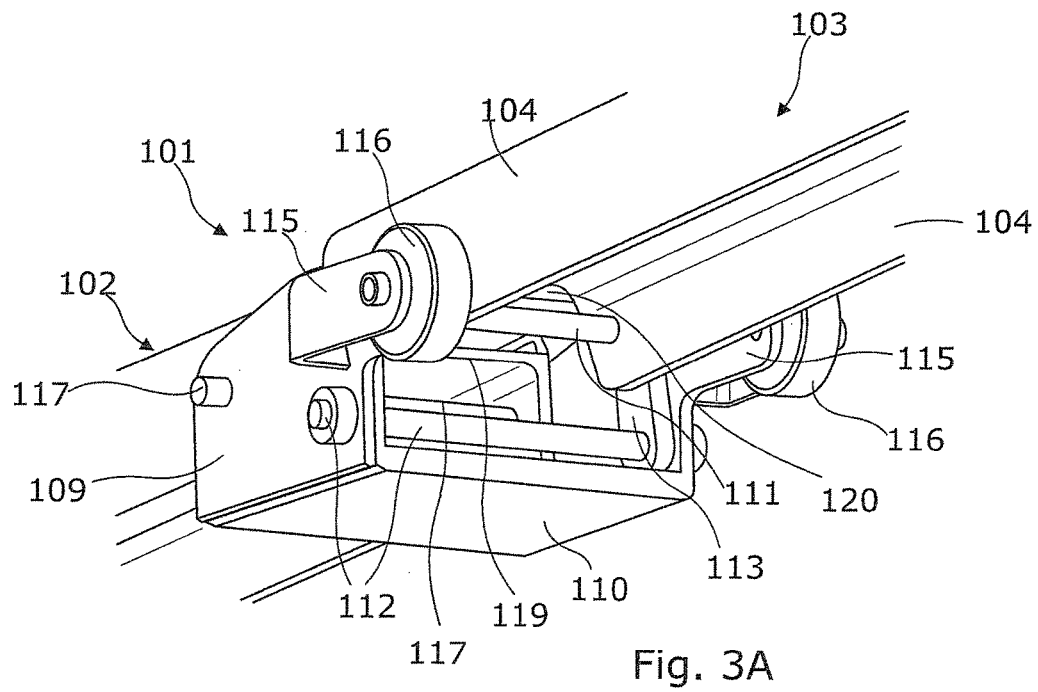
FIG. 3A is a lower perspective view of the linkage assembly of the server rack ramp of FIG. 1.
Figure 3B:
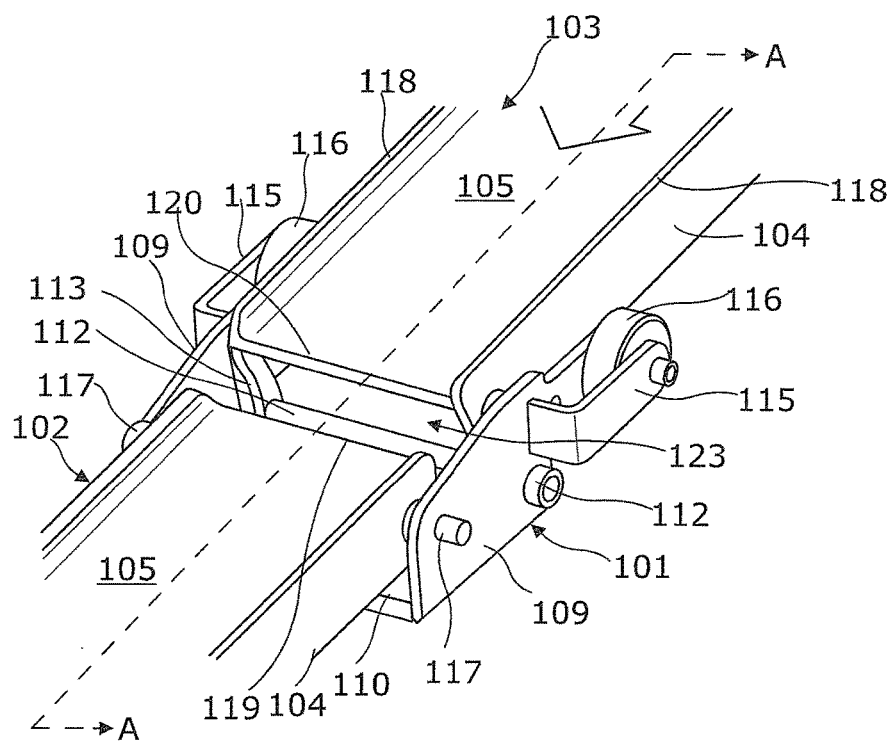
FIG. 3B is an upper perspective view of the linkage assembly of the server rack ramp of FIG. 1.

FIG. 3A is a lower perspective view of the linkage assembly 101 of the server rack ramp 100 of FIG. 1. FIG. 3B is an upper perspective view of the linkage assembly 101 of the server rack ramp 100 of FIG. 1. It should be understood that the example server rack ramp 100 depicted in FIG. 3 may include additional components and that some of the components described herein may be removed and/or modified without departing from a scope of the server rack ramp 100.

In FIGS. 3A and 3B the server rack ramp 100 is shown completely unfolded but partially deployed. In particular, the lower ramp section 102 has been completely unfolded by rotating down the lower ramp section 102 relative to the hinge 117. The upper ramp section 103 has been completely unfolded by rotating down the upper ramp section 102 relative to the second hinge of the linkage-arm. In such example, the base surfaces 115 of the upper ramp section 103 and the lower ramp section 102 do not still form a continuous surface since the second end 119 of the lower ramp section 102 and the first end 120 of the upper ramp section 103 define a gap 123. In such example, the upper ramp section 103 and the lower ramp section 102 neither form a co-planar surface since the second end 120 of the upper ramp section 103 is positioned in a slightly higher plane than the first end 119 of the lower ramp section 102.

In some examples, the sidewalls 104 and the protruding portions 118 of the upper ramp section 103 and the lower ramp section 102 comprise curved endpoints to assist with rotating the upper ramp section 103 and the lower ramp section 102 relative to the linkage assembly 101, when the server rack ramp is being transitioned from its folded configuration into its unfolded configuration and vice versa.

Figure 4A:
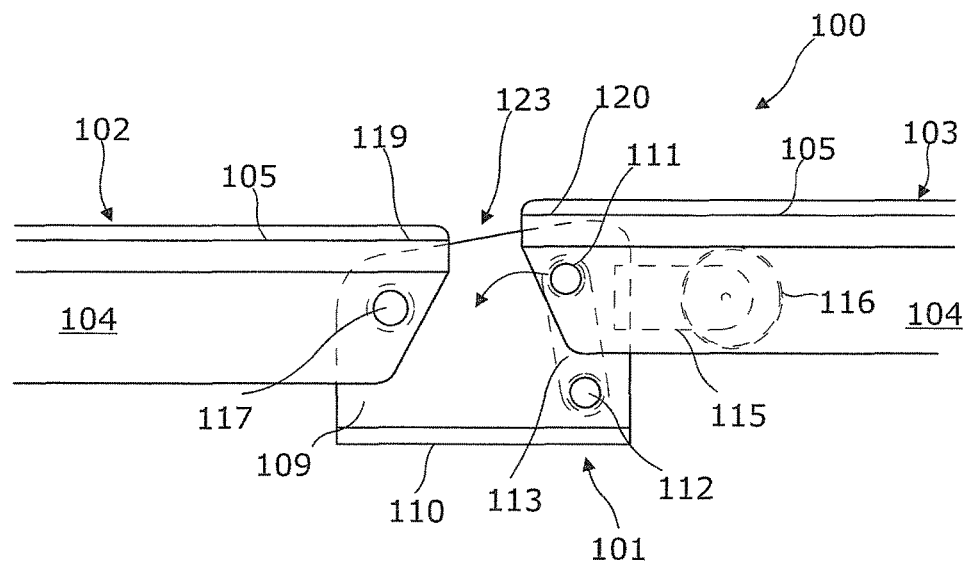
FIG. 4A is a cross sectional view of the linkage assembly of FIG. 3B along line A-A.
Figure 4B:
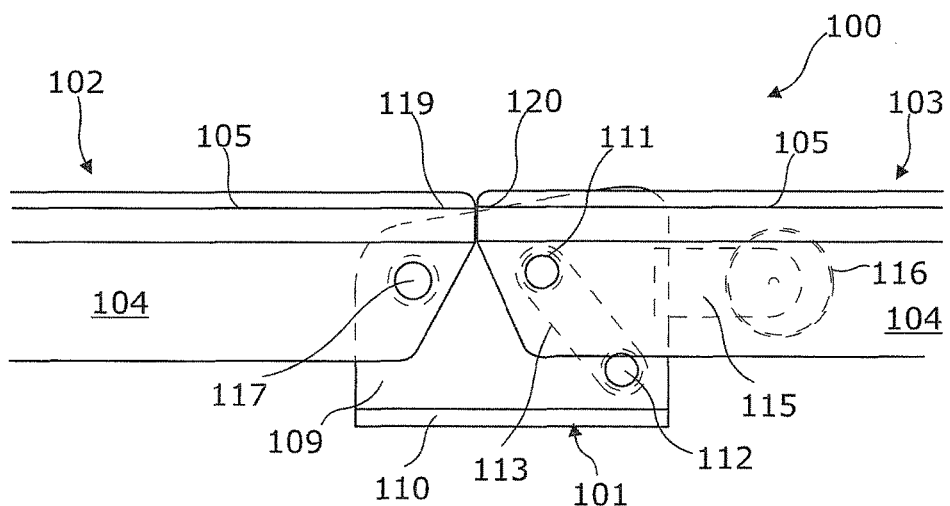
FIG. 4B is a cross sectional view of the linkage assembly of FIG. 2 along line B-B.

FIG. 4A is a cross sectional view of the linkage assembly 101 of FIG. 3B along line A-A. FIG. 4B is a cross sectional view of the linkage assembly 101 of FIG. 2 along line B-B. It should be understood that the example server rack ramp 100 depicted in FIG. 2 may include additional components and that some of the components described herein may be removed and/or modified without departing from a scope of the server rack ramp 100.

FIG. 4A is a cross sectional view of the linkage assembly 101 of FIG. 3B with the linkage-arm hinge in a first position wherein there is a gap 123 between first end 120 of the upper ramp section 103 and second end 119 of the lower ramp section 102. In this first position, the two arms 113 of the linkage-arm hinge is substantially perpendicular to the bottom surface 110 of the U-shaped body of the linkage assembly 101. In this first position the linkage-arm hinge remain in the same position than when the server rack ramp 100 is folded. In such example, the upper ramp section 103 and the lower ramp section 102 have been completely unfolded but the upper ramp section 103 has not been completely deployed.

FIG. 4B is a cross sectional view of the linkage assembly 101 of FIG. 2 with the linkage-arm hinge in a second position wherein the first end 120 of the upper ramp section 103 and second end 119 of the lower ramp section 102 contact to each other. In such example, the linkage-arm hinge has extended from the first position in which the two arms 113 were substantially perpendicular to the bottom surface 110 of the U-shaped body to a second position in which the two arms 113 are longitudinally moved towards the lower ramp section 102. Thus, the upper ramp section 103 rotates relative to the first hinge 112 of the linkage-arm hinge defining a longitudinal movement towards the lower ramp section 102.

Figure 5:
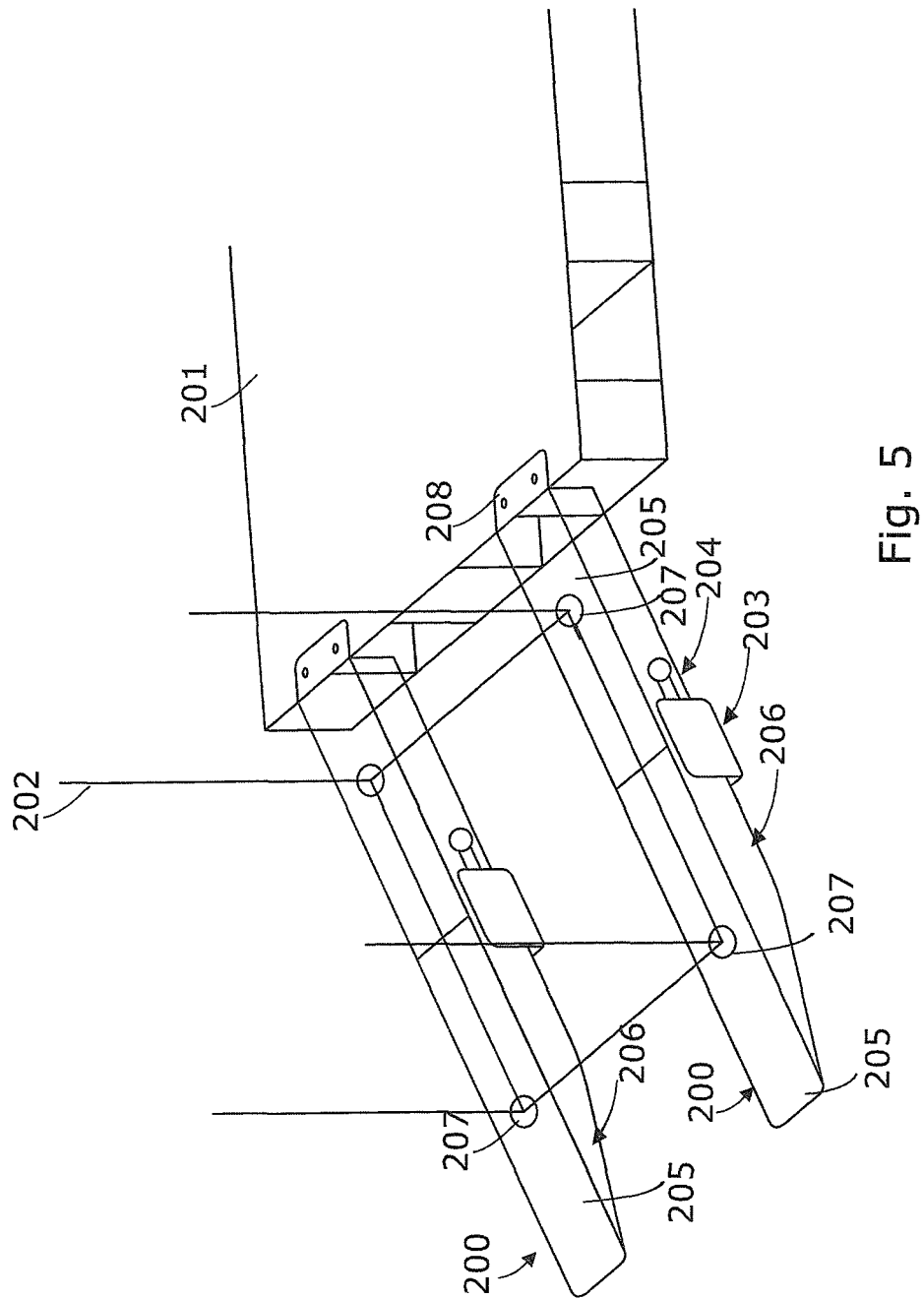
FIG. 5 shows a perspective view of an example system comprising two server rack ramps with linkage-arm hinges attached to a pallet for unloading a server rack from the pallet.

FIG. 5 shows a perspective view of an example system comprising two server rack ramps 200 with linkage-arm hinges attached to a pallet 201 and for unloading a server rack 202 from the pallet. It should be understood that the example system with server rack ramps 200 depicted in FIG. 5 may include additional components and that some of the components described herein may be removed and/or modified without departing from a scope of the system with server rack ramps 200. For example, the server rack ramps 200 of FIG. 5 may be implemented by the server rack ramp 100 of FIGS. 1-4 and 6.

Each server rack ramp 200 comprises an upper ramp section 204 having a base surface 205 with a first end and a second end, a lower ramp section 206 having a base surface 205 with a first end and a second end and a linkage assembly 203. In such example a server rack 202 is being unloaded from a pallet 201 to the floor of a facility, for example a data center. The wheels 207 of the server rack 202 pass over the continuous and co-planar surfaces created by the base surfaces 205 of the respective upper ramp section 204 and lower ramp section 206 of the two server rack ramps 200. These server rack ramps 200 are screwed to the pallet 201 by interposition of respective transition plates 208 while a lower portion of the lower ramp section 206 and the bottom wall of the linkage assembly 203 of both server rack ramps 200 rest on the floor of the data center to provide enough stability to the server rack ramps 200 during the unloading operation. The protruding portions are provided on the lower and upper ramp sections 204,206 for guidance of the server rack 202, or any other heavy machinery or heavy equipment that may be loaded/unloaded, as the loads are moved along the server rack ramp 200. The protruding portions also have a safety purpose to prevent server racks 202, or other heavy loads, from falling off the side of the server rack ramp 200.

In such example, each one of the two server rack ramps 200 is to guide the wheels 207 of one of the sides of the server rack 202. For example, the server racks 202 may be 0'45 m in width and comprise a gross load weight which may exceed 1600 kilograms. Then, each server rack ramp 200 may be attached to the pallet 201 to adequately guide the wheels 207 of the server rack 202. Moreover, each server rack ramp 200 may support half of the weight of the server rack 202 during loading/unloading operation.

Figure 6:
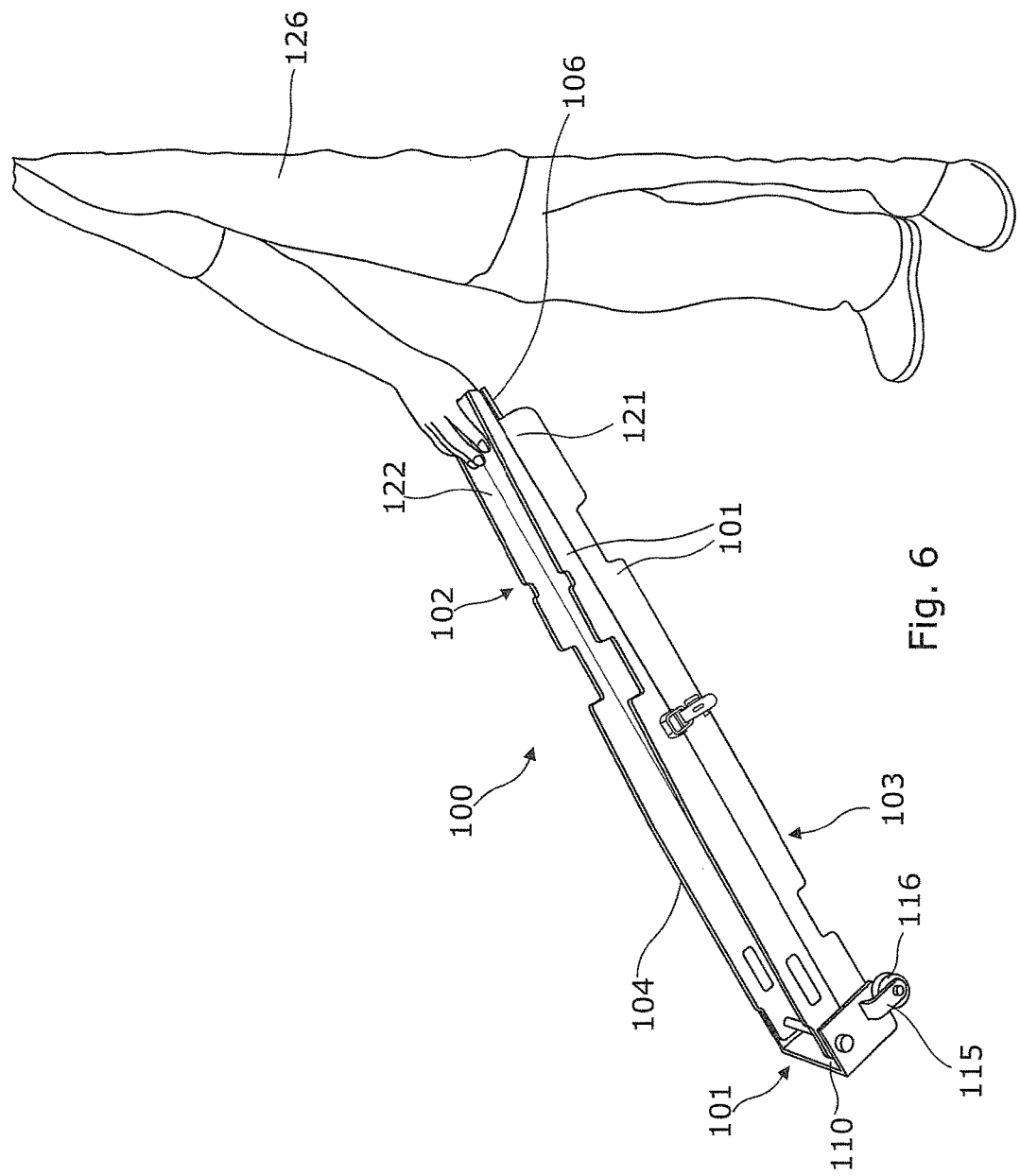
FIG. 6 shows a perspective view of the example server rack ramp of FIG. 1 being transported by a user.

FIG. 6 shows a perspective view of the example server rack ramp 100 of FIG. 1 being transported by a user. It should be understood that the example server rack ramp 100 depicted in FIG. 6 may include additional components and that some of the components described herein may be removed and/or modified without departing from a scope of the server rack ramp 100.

In some examples, the server rack ramp 100, including the upper ramp section 103, the lower ramp section 102 and the linkage assembly 101 may be made of aluminum to make the server rack ramp lighter and easy to transport and fold/unfold. In some examples, the server rack ramp 100 may have a mass of approximately 15-25 kg, which will facilitate ease of storage and transportation while still able to support a fully loaded 1600 kg server rack.

In such example, a user 126 may grab the folded server rack ramp 100 from the first end 121 and the second end 122 of the respective lower ramp section 102 and upper ramp section 103 and incline the server rack ramp 100 towards the wheels 116 until the bottom wall 110 of the linkage assembly 101 stops contacting the floor of the facility. In some other examples, the server rack ramp 100 may comprise a detachable handle (not shown in the figure) that may be attached to the side walls 104 of the lower ramp section 102 or the upper ramp section 103 or that may be attached to the transition plate 106.

Figure 7:
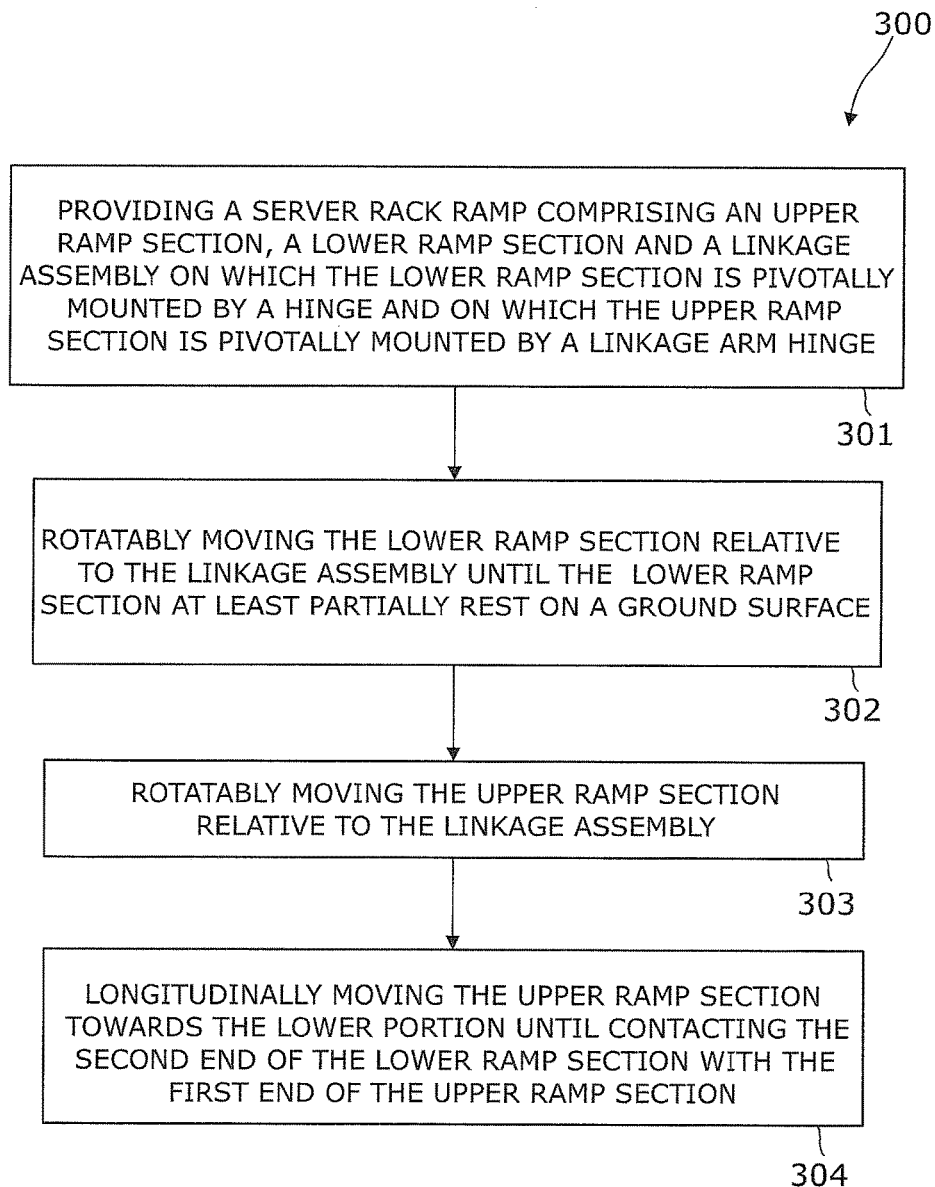
FIG. 7 is a flowchart of a method for unfolding an example server rack system with linkage-arm hinges.

FIG. 7 is a flowchart of a method for unfolding an example server rack system with linkage-arm hinges.

At 301 of the method 300 a server rack ramp comprising an upper ramp section having a base surface with a first end and a second end, a lower ramp section having a base surface with a first end and a second end and a linkage assembly on which the second end of the lower ramp section is pivotally mounted by a hinge and on which the first end of the upper ramp section is pivotally mounted by a linkage-arm hinge is provided.

At 302 of the method 300, the lower ramp section is rotatably moved relative to the linkage assembly until the lower ramp section at least partially rest on a ground surface, for example the floor of a facility such as a data center. At 303 of the method 300, the upper ramp section is rotatably moved relative to the linkage assembly. The rotatable movement of the upper ramp section and upper ramp section relative to the linkage assembly is independent from each other. At 304 of method 300, the upper ramp section is longitudinally moved towards the lower ramp section until contacting the second end of the lower ramp section with the first end of the upper ramp section.

In some examples, the upper ramp section may be attached to a receiving bed, for example the upper surface of a pallet by a transition plate located in the second end of the upper ramp portion. The upper ramp section may attached to the pallet by screwing the transition plate to the pallet. In some other examples, the transition plate may comprise retention mechanisms having magnets, mechanical means, a latch mechanism, etc., to be attached to the pallet.

All of the features disclosed in this specification (including any accompanying claims, abstract and drawings), and/or all of the elements of any method or process so disclosed, may be combined in any combination, except combinations where at least some of such features and/or elements are mutually exclusive.

Furthermore, relative terms used to describe the structural features of the figures illustrated herein are in no way limiting to conceivable implementations. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements.

Server rack ramps with a linkage-arm hinges as described herein may be useful for reducing footprint for storage and shipping eliminating the assembly/disassembly operations, allowing the server rack ramp to work with various pallet heights. It may also be useful for supporting a wide range of pallet heights and weights through the use of this linkage assembly. The server rack ramps with a linkage-arm hinge as described herein may be also able to support a fully loaded 1600 kg server rack. The linkage assembly comprising the linkage-arm hinge as herein described, allow to easily folding and unfolding the two sections of the server rack ramp eliminating the gap between the sections. The server rack ramps herein described may be made of aluminum which makes the server rack ramp lighter and easy to transport and fold/unfold. Besides, the wheels, due to their position relative to the folded server rack ramp, allow for the ramp to easily move while most of the weight of the ramp is on the wheels. This facilitates carrying and transporting the ramp for users. In addition, the small size of the server rack ramp in its folded position facilitates the storage of the ramp by significantly reducing its footprint.

The invention claimed is:

1. A server rack ramp comprising:
an upper ramp section having a base surface with a first end and a second end;
a lower ramp section having a base surface with a first end and a second end;
a linkage assembly comprising a main body and arms, the main body is pivotally connected to the second end of the lower ramp section by a first hinge, the main body is pivotally connected to the arms by a second hinge, and the arms are pivotally connected to the first end of the upper ramp section by a third hinge;
wherein the lower and upper ramp sections are movable between a folded position and an unfolded position by the first, second, and third hinges, the folded position corresponding to a position in which the base surfaces of the upper and lower ramp sections substantially contact each other and the unfolded position corresponding to a position in which the base surfaces of the upper and lower ramp sections are substantially coplanar and the first end of the upper ramp section contacts the second end of the lower ramp section; and
wherein, when the upper ramp section is unfolded, the lower and upper ramp sections are moveable longitudinally relative to one another via rotation of the arms relative to the main body of the linkage assembly and relative to the upper ramp section.

2. The server rack ramp of claim 1 wherein the upper ramp section and the lower ramp section each comprise two side walls downwardly protruding from opposing side edges of the respective base surfaces defining corresponding channel-U-sections.

3. The server rack ramp of claim 2, wherein the two side walls overtake the base surfaces of the upper ramp section and the lower ramp section defining an I-beam section.

4. The server rack ramp of claim 2, wherein at least one of the two side walls comprises a recess to be used as a handle.

5. The server rack ramp of claim 1, wherein the upper ramp section and the lower ramp section each comprise two side walls downwardly protruding from opposing side edges of the respective base surfaces and the first hinge is attached to the two side walls of the lower ramp section and the third hinge is attached to the two side walls of the upper ramp section.

6. The server rack ramp of claim 1, wherein the main body of the linkage assembly is a U-shaped body having a bottom wall and two opposing side walls, wherein the first and second hinges are attached to the opposing side walls.

7. The server rack ramp of claim 1, wherein the upper ramp section comprises a transition plate located at its second end that is to rest on a receiving bed and support the second end of the upper ramp section when the server rack ramp is deployed.

8. The server rack ramp of claim 7, wherein the transition plate includes screw holes to enable the upper ramp section to be attached to a receiving bed by screws.

9. The server rack ramp of claim 6, wherein, when the lower and upper ramp sections are in the unfolded position and the lower section is deployed on a ground surface, the bottom wall of the linkage assembly rests on the ground surface.

10. The server rack ramp of claim 1, comprising a latch mechanism to retain the lower ramp section and the upper ramp section in the folded position.

11. The server rack ramp of claim 1, wherein the linkage assembly comprises a wheel attached to each side of the main body via wheel brackets such that wheel brackets protrude from the main body in a direction parallel to a bottom wall of the U-shaped body.

12. The server rack ramp of claim 1, wherein the upper ramp section, the lower ramp section and the linkage assembly are made of aluminum.

13. A system comprising:
two of the server rack ramps of claim 1,
wherein, for each of the server rack ramps, the upper ramp section includes a transition plate at the second end thereof that is to rest on a receiving bed and support the second end of the upper ramp section when the server rack ramp is deployed.

14. A method comprising:
providing the server rack ramp of claim 1;
rotatably moving the lower ramp section relative to the linkage assembly until at least part of the lower ramp section rests on a ground surface;
rotatably moving the upper ramp section relative to the linkage assembly; and
longitudinally moving the upper ramp section towards the lower ramp section until contacting the second end of the lower ramp section with the first end of the upper ramp section.

15. The method of claim 14, further comprising attaching the upper ramp section to a receiving bed by a transition plate connected to the second end of the upper ramp section.

16. The sever rack ramp of claim 2, wherein the two side walls of the lower ramp section are tapered towards the first end of the lower ramp section such that at least part of the two side walls rests on a ground surface when the server rack ramp is the unfolded position and deployed.

17. The sever rack ramp of claim 16, wherein the linkage assembly is to rest on the ground surface when a tapered portion of the two side walls of the lower ramp section are resting on the ground surface.

18. The server rack ramp of claim 11,
wherein, when the lower and upper ramp sections are in the folded position, the wheels extend out beyond side walls of the upper ramp or the lower ramp such that wheels are able to contact a ground surface to support the server rack ramp, and
when the lower and upper ramp sections are in the unfolded position, the wheels are located alongside side walls of the upper surface or lower surface such that the wheels do not contact a ground surface and do not protrude above the side walls.

19. The method of claim 15, wherein a bottom surface of the linkage assembly is in contact with the ground surface while the lower ramp section rests on the ground and the upper ramp section is attached to the receiving bed.

* * * * *